June 4, 1963 F. BOOTH ETAL 3,092,509
GLASS FIBER REINFORCED BATTERY SEPARATORS
Filed Aug. 13, 1958
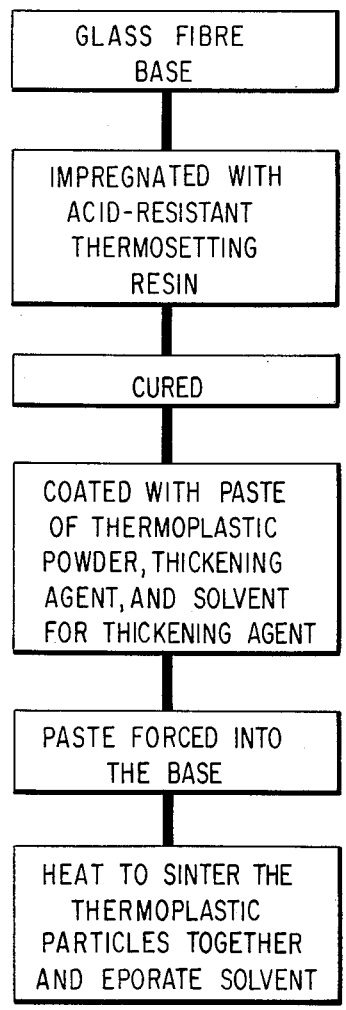
INVENTORS
FRANK BOOTH
MICHAEL PAUL LATHAM
BY
ATTORNEYS

3,092,509
GLASS FIBER REINFORCED BATTERY SEPARATORS

Frank Booth and Michael Paul Latham, Manchester, England, assignors to Oldham & Son Limited, Manchester, England, a corporation of Great Britain
Filed Aug. 13, 1958, Ser. No. 754,712
Claims priority, application Great Britain Aug. 22, 1957
2 Claims. (Cl. 117—76)

This invention relates to a method of manufacturing improved electric battery separator material.

Electric battery separators are commonly made of fibrous material bonded together by resin resistant to the battery acid, but in the instance where the fibrous material is constituted of glass fibres, which have the considerable advantage over cellulosic fibres of being virtually completely unaffected by the battery acid, difficulty arises in respect of the consequential irregular and high permeability of the separator, enabling for example loose particles of lead from the plates to penetrate through the separator when it is of only normal separator thickness. In order to regulate the permeability of a glass fibre separator it has previously been proposed to coat the surface of the separator particles of a synthetic resin or plastic material. This method, which involves the provision of layers of two different materials, inevitably increases the thickness of the battery separator above that which is desirable, and at the same time the coating of the plastic material is somewhat brittle and is liable to crack and peel.

A main object of the present invention is to provide a method of making a glass fibre separator having a regular and controlled permeability and which is thin and durable.

The present invention provides a method of making an electric battery separator material from a glass fibre base, the method being conveniently illustrated on the accompanying drawing by a flow diagram.

One class of thickening agents which are suitable for use in the process according to the present invention are those of the cellulose type, for example carboxyalkyl celluloses, such as sodium carboxymethyl cellulose, and those of the alginate type, such as sodium alginate. In the case of this class of thickening agents, the preferred solvent therefor is water.

Another class of suitable thickening agents are acid-resistant resins; the acid-resistant resin used as the thickening agent may be the same as or different from that used to bond the fibres of the base together. Suitable acid-resistant resins for both purposes are, for example, phenol-formaldehyde, cresol-aldehyde and furfural-aldehyde resins. The solvent used in the spreadable mixture in this case will depend on the nature of the acid-resistant resin; where the acid-resistant resin is water-soluble, the preferred solvent is water, while in the case of spirit-soluble resins, the solvent is preferably of alcoholic nature. Where an acid-resistant resin is used as the thickening agent, the final heat treatment is advantageously such as to cure the resin, in addition to sintering the thermoplastic and evaporating the solvent.

In order to provide maximum mechanical strength for the eventual separators, after the mixture has been applied to the base the latter is preferably passed between scrapers which form a sheet of the base having a flat face on one side and a ribbed face on the other side.

Alternatively, by effecting ribbing a given mechanical strength for the separator can be achieved with a minimum thickness of the separator sheet.

Ribbing may also be effected after the sintering treatment, or after the sintering treatment followed by a pore size regulating treatment as hereinafter described, by warming the separator material and passing it over a grooved drum associated with a number of finned rollers so that the separator material is progressively ribbed starting from the centre outwardly as it passes between the nips between successive rollers and the drum, as described in detail in United States Patent No. 2,811,745.

In instances where a very small pore size is required, the size of the pores of the separator material produced by the process according to the present invention may be subsequently reduced to a predetermined extent by applying to a face of the separator material, particles of a finely divided industrial thermoplastic so as to form a layer of abutting particles on the face and then fusing the abutting particles together at their points of contact so as to form a continuous network of the thermoplastic over the face and adhering thereto, said network having interstices which constitute the pores of regulated size. For example, particles of polyvinyl chloride having an average particle diameter of from ½ to 10 microns may be brushed over a face of the separator, preferably the ribbed face, if the separator includes a ribbed face, and fused by heating the coated separator at about 150° C.

Operational details of this pore size regulating treatment are contained in our copending application Serial No. 755,921, filed August 19, 1958, now abandoned.

In order that the invention may be more fully understood some preferred embodiments thereof will now be described by way of example.

A base of reinforced glass fibrous material, in which the fibres are either interleaved, woven or felted, is taken and the fibres bonded together by impregnation with a water-soluble phenolformaldehyde resin followed by curing.

The base is then pasted with a spreadable mixture of finely divided polyvinyl chloride and a 2% aqueous solution of sodium carboxymethylcellulose. The finely divided polyvinyl chloride employed was a mixture of 10 parts by weight of powdered polyvinyl chloride having an average particle diameter of over 10 microns and 1 part by weight of powdered polyvinyl chloride having an average particle diameter of from ½ to 1 micron.

After the base has been pasted, it is passed between a pair of scrapers acting as an extrusion slot which shape the base into a sheet having one face flat and the other ribbed at spaced intervals parallel to the length of the eventual separators, so as to produce a configuration of the kind well-known in this art.

The pressure exerted by the scrapers aids the penetration of the mixture into the base and since the base in practice is very thin, having a thickness of the order of 0.015 to 0.020 inch, substantially completely uniform distribution of the mixture throughout the base is achieved.

The shaped sheet is dried off at between 80°–90° C. and then heated at about 190° C. for a sufficient length of time to sinter the polyvinyl chloride particles together, this time being usually indicated by the sheet being of a golden-brown colour. The employment of a percentage of polyvinyl chloride of extremely fine particle size in the spreadable mixture, as described, aids the fritting of the whole mass and increases the strength of the separator. Finally, the separator sheet is wet out with a 0.5% solution of a suitable wetting agent, such as a sulphonated oil wetting agent, and dried.

Another example of a spreadable mixture which may be used to form separator material according to the invention, in place of the sodium carboxymethylcellulose-containing spreadable mixture referred to above, is a mixture formed from the same mixed polyvinyl chloride powders and a 10% aqueous solution of water-soluble phenolformaldehyde resin. In this case heating is preferably effected at about 165° C. and is carried out for a sufficient length of time to cure the phenol-formaldehyde resin, in addition to sintering the polyvinyl chloride particles together and driving off the water.

It will be appreciated that the pasting, shaping and heating steps described above may be carried out on individual quantities of glass fibre base, or on a web of the glass fibre base advancing continuously through consecutive pasting, shaping and heating stations, thus providing a continuous process. In the latter case, the web will have to be chopped into sections forming the individual separators after leaving the heating stations.

Polyvinyl acetate powder may be employed instead of polyvinyl chloride powder, in which case a fusing temperature of about 190° C. is again suitable.

The fusing of the thermoplastic particles produces a continuous structure of the thermoplastic which fills the interstices between the fibres and reduces the permeability of the base. For example, when preparing a separator by the method described in the example the pore size may be reduced from an average diameter of about 200 microns directly after the initial bonding of the glass fibres to an average diameter of about 40 microns.

The pore size may be further reduced, however, before the final treatment of the separator by the wetting agent, to an average diameter of about ½ micron for example, by applying and then fusing together a surface layer of particles of an industrial thermoplastic of such a nature as to be adherent to the glass fibres, as hereinbefore mentioned.

Additionally, the network structure of fused plastic particles, as it extends into the separator, acts as an internal stiffener and increases the mechanical strength and rigidity thereof.

By means of the invention there is accordingly provided a glass fibre separator having such mechanical and electrical characteristics as to enable it to be practically useful without needing to be of excessive thickness compared with cellulosic pulp separators.

We claim:
1. A process of manufacturing electric storage battery separator material from base material consisting of glass fibres bonded with a cured acid resistant thermosetting resin, comprising pasting one side of the bonded glass fibre base with a paste consisting of a thermoplastic resin powder which is a mixture of 10 parts by weight of particles having an average diameter of at least 10 microns and 1 part by weight of particles having an average diameter of from ½ to 1 micron, a thickening agent selected from the group consisting of carboxyalkyl celluloses, alignates, and acid-resistant resins, and a solvent for the thickening agent, forcing the paste into the base to impregnate the base uniformly with the paste, and heating the impregnated base to a temperature sufficient to evaporate the solvent for the thickening agent and to sinter together the thermoplastic particles to produce a sintered porous structure of said synthetic resin powder extending throughout said bonded glass fibre base.

2. The process of claim 1 in which the thermoplastic resin is polyvinyl chloride.

References Cited in the file of this patent

UNITED STATES PATENTS

| | | |
|---|---|---|
| 2,297,248 | Rudolph | Sept. 29, 1942 |
| 2,371,868 | Berg et al. | Mar. 20, 1945 |
| 2,465,493 | Strickhouser et al. | Mar. 29, 1949 |
| 2,478,186 | Gerber | Aug. 9, 1949 |
| 2,526,591 | Szper | Oct. 17, 1950 |
| 2,591,755 | Wilson et al. | Apr. 8, 1952 |
| 2,607,810 | Walker | Aug. 19, 1952 |
| 2,633,434 | Tanner | Mar. 31, 1953 |
| 2,653,985 | Philipps | Sept. 29, 1953 |
| 2,664,376 | Phillipps | Dec. 29, 1953 |
| 2,847,496 | Yamaura | Aug. 12, 1958 |
| 2,889,390 | Schwartz | June 2, 1959 |
| 2,929,005 | Lilienfeld | Mar. 15, 1960 |
| 2,930,106 | Wrotnowski | Mar. 29, 1960 |
| 2,973,398 | Hubbard et al. | Feb. 28, 1961 |

FOREIGN PATENTS

| | | |
|---|---|---|
| 674,684 | Great Britain | June 25, 1952 |
| 678,719 | Great Britain | Sept. 10, 1952 |
| 749,778 | Great Britain | May 30, 1956 |
| 523,464 | Canada | Apr. 3, 1956 |